(12) United States Patent
Okuya et al.

(10) Patent No.: US 9,351,376 B2
(45) Date of Patent: May 24, 2016

(54) ILLUMINATION CONTROL SYSTEM

(71) Applicant: PANASONIC CORPORATION, Osaka (JP)

(72) Inventors: Teruhisa Okuya, Osaka (JP); Yuriko Uegaki, Osaka (JP); Toru Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/467,279

(22) Filed: Aug. 25, 2014

(65) Prior Publication Data

US 2015/0097490 A1  Apr. 9, 2015

(30) Foreign Application Priority Data

Sep. 27, 2013  (JP) .................................. 2013-201971

(51) Int. Cl.
*H05B 37/02* (2006.01)
(52) U.S. Cl.
CPC ............. *H05B 37/0227* (2013.01); *Y02B 20/44* (2013.01)
(58) Field of Classification Search
USPC .......... 315/149, 158, 291; 382/103, 117, 162, 382/164, 181, 190; 348/68, 73, 78, 142, 348/169, 370
See application file for complete search history.

(56) References Cited

U.S. PATENT DOCUMENTS

| 2003/0062856 | A1 | 4/2003 | Yano et al. | |
| 2007/0014431 | A1* | 1/2007 | Hammoud | G06K 9/00604 382/103 |
| 2010/0254571 | A1* | 10/2010 | Matsuura | G06K 9/3266 382/103 |
| 2011/0227488 | A1* | 9/2011 | Liao | H05B 33/0872 315/159 |

FOREIGN PATENT DOCUMENTS

| JP | 2003-175109 | 6/2003 |
| JP | 2006-21591 | 1/2006 |
| JP | 2006-151287 | 6/2006 |
| JP | 2009-96384 | 5/2009 |
| JP | 2009-266484 | 11/2009 |

* cited by examiner

*Primary Examiner* — Thai Pham
(74) *Attorney, Agent, or Firm* — Greenblum & Bernstein, P.L.C.

(57) ABSTRACT

An illumination control system includes a signal detection unit for detecting a signal changed depending on an eye state of a person, an opening/closing determination unit for determining an opening/closing state of an eye of the person based on the detected signal, and a sight line detection unit for detecting a person's sight line direction with respect to an illumination device based on the detected signal. The illumination control system further includes a control unit for controlling the illumination device to reduce an illuminance when the opening/closing determination unit determines that the eye of the person is in a closed eye state, and to change an illuminance and a light color based on the sight line direction detected by the sight line detection unit when the opening/closing determination unit determines that the eye of the person is in an open eye state.

4 Claims, 6 Drawing Sheets

DISTANCE FROM FOVEA TO LIGHT SOURCE (DEGREES)

DISTANCE FROM FOVEA TO LIGHT SOURCE (DEGREES)

ILLUMINATION CONTROL SYSTEM

CROSS-REFERENCES TO RELATED APPLICATIONS

This application claims priority to Japanese Patent Application No. 2013-201971 filed with the Japan Patent Office on Sep. 27, 2013, the entire contents of which are incorporated herein by reference.

TECHNICAL FIELD

The present disclosure relates to an illumination control system.

BACKGROUND ART

A technique of controlling illumination depending on the user's state is disclosed in Japanese Unexamined Patent Application Publication No. 2009-266484.

Japanese Unexamined Patent Application Publication No. 2009-266484 discloses an illumination device in which a light stimulus is applied to a target person to effectively promote the awakening of the person regardless of the opening and closing of the eyes of the person. More specifically, when the user's eye is in a closed eye state, the illumination device turns on a light source that generates light of a wavelength region where the light transmittance to an eyelid is high. When the user's eye is in an open eye state, the illumination device turns on a light source that generates light of a wavelength region where an effect of suppressing the secretion of melatonin remains high.

However, the aforementioned illumination device is designed to apply a light stimulus to a user regardless of the opening and closing of the user's eye. For that reason, the user feels a glare when the user's eye is opened from a closed eye state or when the line of sight is oriented toward a light source.

SUMMARY OF THE INVENTION

In view of the above, the present disclosure provides an illumination control system capable of reducing a glare given to a user by illumination.

In accordance with an aspect of the present invention, there is provided an illumination control system for controlling an illumination device, including: a signal detection unit configured to detect a signal changed depending on an eye state of a person in a space where the illumination device is installed; an opening/closing determination unit configured to determine an opening/closing state of an eye of the person based on the signal detected by the signal detection unit; a sight line detection unit configured to detect a person's sight line direction with respect to the illumination device based on the signal detected by the signal detection unit; and a control unit configured to control the illumination device to reduce an illuminance when the opening/closing determination unit determines that the eye of the person is in a closed eye state, and to control the illumination device to change an illuminance and a light color based on the sight line direction detected by the sight line detection unit when the opening/closing determination unit determines that the eye of the person is in an open eye state.

The signal detection unit may include at least one of a camera, an eye potential measuring instrument and a brain activity detector.

With such configurations, it is possible to reduce a glare given to the person by illumination.

BRIEF DESCRIPTION OF THE DRAWINGS

The figures depict one or more implementation in accordance with the present teaching, by way of example only, not by way of limitations. In the figures, like reference numerals refer to the same or similar elements.

FIGS. 2A and 2B are views illustrating images detected depending on the eye state in the illumination control system, wherein FIG. 2A shows an open eye state and FIG. 2B shows a slightly-open eye state.

DETAILED DESCRIPTION

One embodiment of the present invention will now be described with reference to the accompanying drawings.

Figure 1:
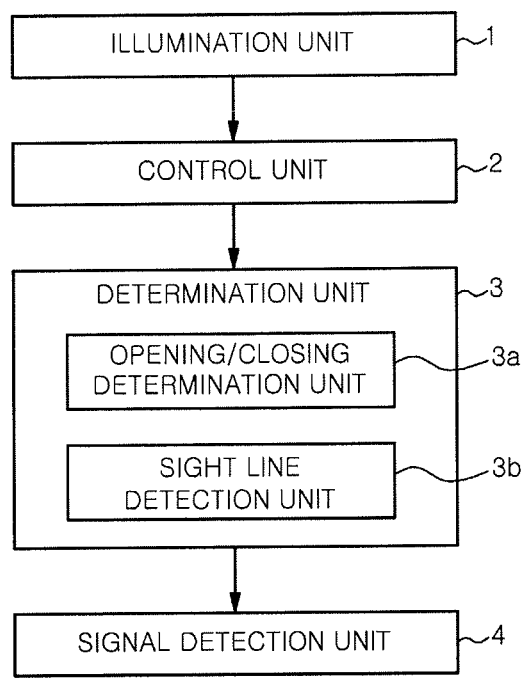
FIG. 1 is a block diagram showing a configuration of an illumination control system according to an embodiment of the present invention.

For example, an illumination control system according to an embodiment of the present invention is configured as shown in FIG. 1. The illumination control system may include an illumination unit 1, a control unit 2, a determination unit 3 and a signal detection unit 4. The control unit 2, the determination unit 3 and the signal detection unit 4 are configured by, e.g., a microcomputer.

The installation positions of the illumination unit 1, the control unit 2, the determination unit 3 and the signal detection unit 4 may be arbitrary. For example, the illumination unit 1 as a ceiling light may be installed at a ceiling together with the control unit 2. The determination unit 3 and the signal detection unit 4 may be installed independently of the ceiling light.

The illumination unit 1 is, e.g., an illumination device installed in each room of a home. The illumination unit 1 may be ceiling light arranged in a ceiling of a room or may be a spotlight arranged in an arbitrary point. The illumination unit 1 is capable of changing the brightness and color of illumination light. It is preferred that the illumination unit 1 can change the brightness and color of illumination light in every direction from the installation position thereof.

A light distribution pattern of the illumination unit 1 is controlled by a control signal transmitted from the control unit 2. The light distribution pattern refers to a combination of the brightness and color of illumination light with respect to the directions from the installation position of the illumination unit 1. Thus, the illumination unit 1 can adjust an illuminance and a color in a space where the illumination unit 1 is installed.

The signal detection unit 4 serves to detect a signal that varies with an eye state of a user. The signal detection unit 4 is at least one of a camera, an eye potential measuring instrument and a brain activity detector.

The determination unit 3 includes a opening/closing determination unit 3a and a sight line detection unit 3b. The opening/closing determination unit 3a determines an opening/closing state of an eye based on a signal detected by the signal detection unit 4. The sight line detection unit 3b detects a user's sight line direction with respect to the illumination unit 1 based on a signal detected by the signal detection unit 4.

Figure 2A:
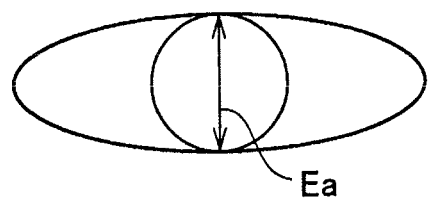
Figure 2B:
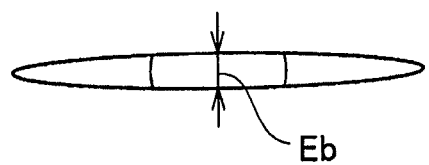

In case where the signal detection unit 4 is a camera, the signal detection unit 4 obtains an image signal shown in FIG. 2A or 2B. The image signal includes an eye contour. If the user's eye is in an open eye state, the signal detection unit 4 can obtain an image signal which indicates an image whose shortest width passing through an eye's center point (vertical length) is Ea as shown in FIG. 2A. On the other hand, if the user's eye is in a slightly-open eye state, the signal detection unit 4 can obtain an image signal which indicates an image whose shortest width passing through an eye's center point (vertical length) is Eb as shown in FIG. 2B. Eb may be a preset value which is smaller than Ea obtained in the open eye state and which can be determined not to indicate a closed eye state.

The opening/closing determination unit 3a of the determination unit 3 extracts an eye contour through an edge extraction treatment performed with respect to the image signal or a template matching method. The opening/closing determination unit 3a monitors a vertical length of an eye. If the vertical length of an eye is zero, the opening/closing determination unit 3a determines that the eye is in a closed eye state.

In case where the signal detection unit 4 is an eye potential measuring instrument, the signal detection unit 4 measures a myogenic potential around an eye. For example, a first electrode is affixed to a body region just above the eye and a second electrode is affixed to a body region just below the eye. Based on the signals transmitted from the respective electrodes, the signal detection unit 4 detects myogenic potentials and then executes an amplifying treatment, a filtering treatment, an A-D converting treatment, a motion averaging treatment and a logic combining treatment.

The opening/closing determination unit 3a of the determination unit 3 extracts a maximum potential and a minimum potential for a predetermined period (e.g., several hundred milliseconds). If a difference between the maximum potential and the minimum potential exceeds a predetermined value, the opening/closing determination unit 3a determines that an eyelid has been moved. In this way, the opening/closing determination unit 3a determines whether the eye is in a closed eye state.

If a plurality of users exists in an arbitrary space and if all the users close their eyes, the opening/closing determination unit 3a may determine that the eye is in a closed eye state. Moreover, if any one of the users opens his or her eyes, the opening/closing determination unit 3a may determine that the eye is in an open eye state.

In case where the signal detection unit 4 is a brain activity detector, the signal detection unit 4 detects brain waves of a user. The opening/closing determination unit 3a of the determination unit 3 detects a frequency component of a waves contained in the brain waves of a user. If a frequency component of 8 to 13 Hz belonging to an a-wave band is contained in a larger amount, the opening/closing determination unit 3a determines that the eye is in a closed eye state.

Based on the signal transmitted from the signal detection unit 4, the sight line detection unit 3b detects a user's sight line direction with respect to the illumination unit 1. If the signal detection unit 4 includes a camera, the sight line detection unit 3b acquires an image signal of the camera. The sight line detection unit 3b detects a pupil of a user's eye from the image signal of the camera. The sight line detection unit 3b determines a user's sight line direction with respect to the illumination unit 1 based on the size and direction of the pupil included in an image. For example, if the pupil included in the image is small in size, the sight line detection unit 3b can determine that the sight line comes closer to the illumination unit 1 which is kept turned on.

The control unit 2 controls the illumination unit 1 based on the determination result of the determination unit 3. At this time, the control unit 2 controls the illumination unit 1 to suppress the user's feeling of a glare attributable to the light generated by the illumination unit 1.

If the opening/closing determination unit 3a determines that the user's eye is in a closed eye state, the control unit 2 controls the illumination unit 1 to reduce an illuminance. The control unit 2 reduces the brightness of the illumination unit 1 to such an illuminance that, when the user opens his or her eyes, the user does not feel a glare attributable to the light generated by the illumination unit 1. At this time, the control unit 2 may change the brightness of individual light sources included in the illumination unit 1. Alternatively, the control unit 2 may control the number of the turned-on light sources among the light sources included in the illumination unit 1.

Figure 3:
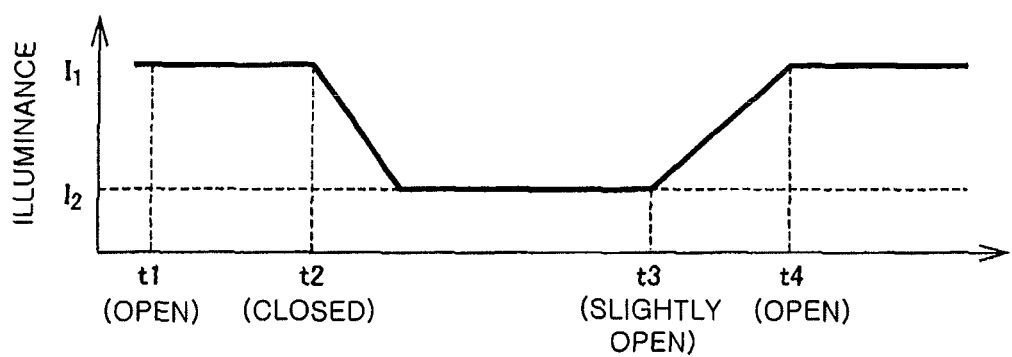
FIG. 3 is a view showing the relationship between an eye state and an illuminance in the illumination control system.

More specifically, if the user's eye is changed from an open eye state (time t1) to a closed eye state (time t2) as shown in FIG. 3, the illumination control system reduces an illuminance from $I_1$ to $I_2$. At this time, the control unit 2 controls the illumination unit 1 so as to gradually reduce the illuminance from time t2 at which the user's eye is determined to be in a closed eye state.

Thereafter, a slightly-open eye state of the user's eye is detected at time t3. Then, the control unit 2 gradually increases the illuminance from $I_2$. If the user's eye comes into an open eye state at time t4, the control unit 2 increases the illuminance to $I_1$.

The illuminance $I_1$ may be a preset illuminance or may be an illuminance set by the user. It is preferred that the illuminance $I_2$ is an illuminance at which the user having open eyes does not feel a glare.

If the opening/closing determination unit 3a determines that the user's eye is in an open eye state, the control unit 2 changes an illuminance and a light color by controlling the illumination unit 1 based on the sight line direction detected by the sight line detection unit 3b. If the user's sight line direction is oriented toward the illumination unit 1, the control unit 2 reduces an illuminance and a color depth.

Figure 4A:
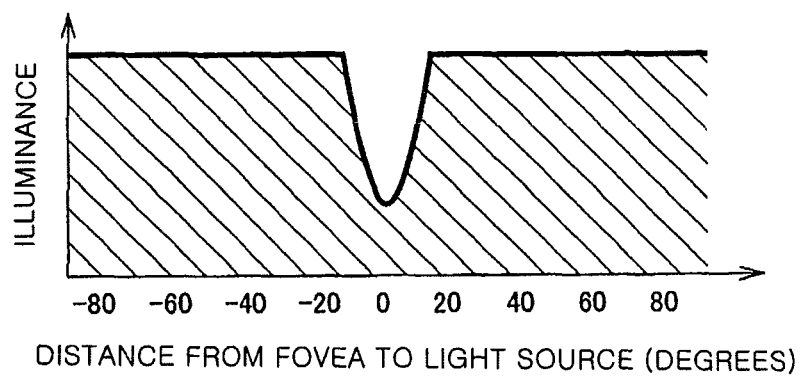
FIG. 4A is a view showing the relationship between a distance (angle) from a fovea of an eye to a light source and an illuminance in the illumination control system.
Figure 4B:
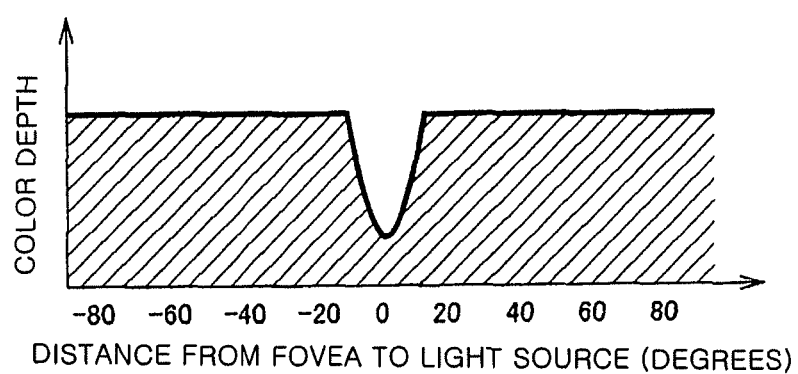
FIG. 4B is a view showing the relationship between a distance (angle) from a fovea of an eye to a light source and a color depth in the illumination control system.

More specifically, as shown in FIGS. 4A and 4B, the control unit 2 adjusts an illuminance and a color depth. Referring to FIGS. 4A and 4B, the control unit 2 reduces an illuminance and a color depth if a distance (angle) from a fovea of an eye to a light source is short. The distance (angle) from a fovea of an eye to a light source being short means that the user's sight line direction is oriented toward the illumination unit 1. Accordingly, the control unit 2 reduces an illuminance and a color depth if the sight line detected by the sight line detection unit 3b is close to the illumination unit 1.

The relationships between a distance (angle) from a fovea of an eye to a light source and an illuminance and a color depth respectively shown in FIGS. 4A and 4B are pre-stored in the control unit 2. The control unit 2 can recognize, from the detected sight line direction, the stored distance (angle) from a fovea of an eye to a light source.

Since the sensitivity to the brightness becomes higher as the sight line direction comes closer to a direction in which a user looks the illumination unit 1 straight, the control unit 2 reduces the illuminance as shown in FIG. 4A. In this way, the illumination control system reduces a glare felt by a user when the user looks the illumination unit 1 straight.

Inasmuch as the light color is more easily perceived as the sight line direction comes closer to a direction in which a user looks the illumination unit 1 straight, the control unit 2 makes the color depth thin as shown in FIG. 4B. In this way, the illumination control system reduces the sense of discomfort caused by the highlighted color.

Figure 5:
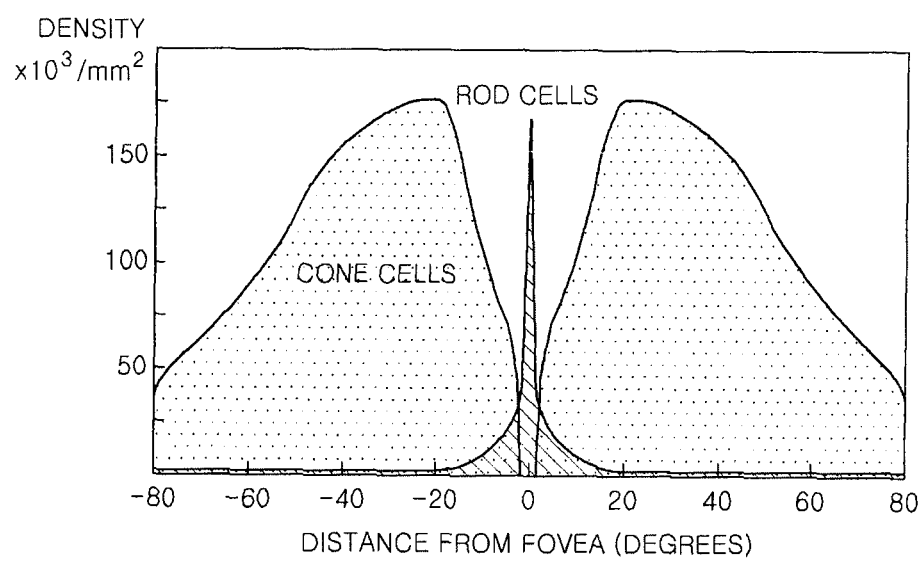
FIG. 5 is a view showing the relationship between the distance (angle) from a fovea of an eye and the distributions of cone cells and rod cells.

In the eyes of a human, rod cells and cone cells, which are visual cells of a retina, work except a case where an illuminance is very low. The rod cells and the cone cells are dispersed in the retina at a density shown in FIG. 5. The cone cells are mostly distributed in the vicinity of the fovea. The rod cells are mostly distributed in a region spaced apart from the fovea. The cone cells work in case where surroundings are bright. On the other hand, the rod cells work in case where surroundings are dark.

Accordingly, the relationships between a distance (angle) from a fovea of an eye to a light source and an illuminance and a color depth, which are stored in the control unit 2 and which are respectively shown in FIGS. 4A and 4B, correspond to the distance (angle) from a fovea of an eye, in which visual cells of a retina are distributed, to a light source. That is to say, the illumination control system is designed to reduce the sense of discomfort caused by a glare and a color depth. In this way, the illumination control system can reduce the sense of discomfort caused by a glare and a color depth.

Figure 6:
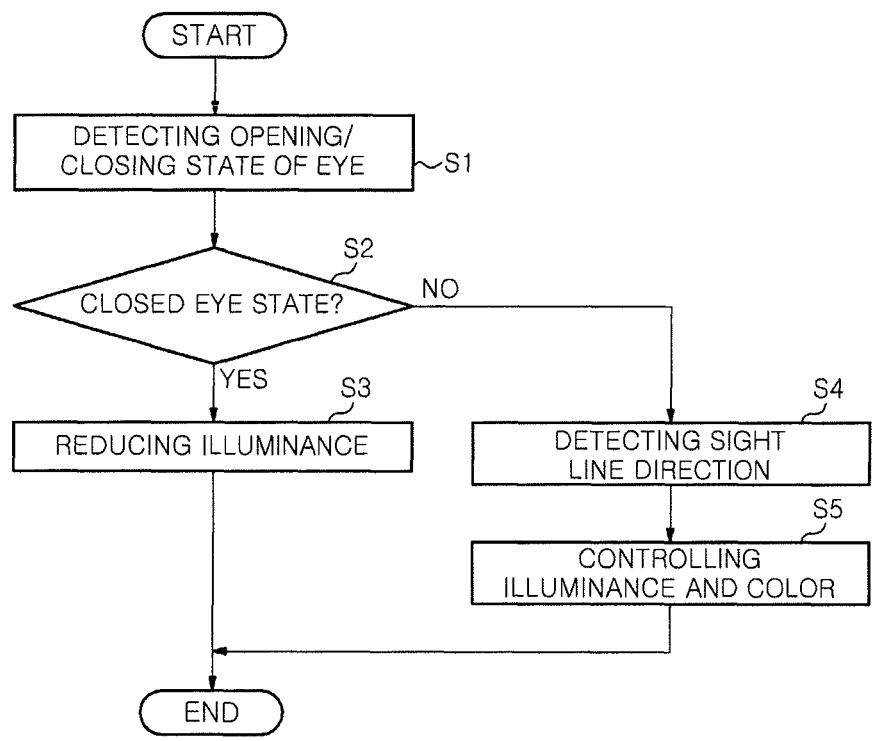
FIG. 6 is a flowchart illustrating the operation of the illumination control system.

The illumination control system configured as above has the aforementioned functions and operates as illustrated in FIG. 6.

First, in step S1, the signal detection unit 4 of the illumination control system detects a signal changed depending on a user's eye state, thereby detecting the opening/closing state of the eye.

Next, in step S2, the opening/closing determination unit 3a of the determination unit 3 of the illumination control system determines whether the user's eye is in a closed eye state, based on the signal detected in step S1. If the user's eye is in the closed eye state, the flow proceeds to step S3. If the user's eye is not in the closed eye state, the flow proceeds to step S4.

In step S3, the control unit 2 of the illumination control system reduces the illuminance of the illumination unit 1.

In step S4, the sight line detection unit 3b of the determination unit 3 of the illumination control system detects a user's sight line direction based on the signal detected in step S1.

In step S5, the control unit 2 of the illumination control system controls the illuminance and the light color depending on the sight line direction detected in step S4.

As described above, the illumination control system controls the illumination device 1 installed in a space where a user exists. The illumination control system includes the signal detection unit 4 for detecting a signal changed depending on a user's eye state. The illumination control system further includes the opening/closing determination unit 3a for determining an opening/closing state of an eye based on the signal detected by the signal detection unit and a sight line detection unit 3b for detecting a user's sight line direction with respect to the illumination device based on the signal detected by the signal detection unit. The illumination control system further includes the control unit 2 for controlling the illumination device to reduce an illuminance if the opening/closing determination unit determines that a user's eye is in a closed eye state. On the other hand, if the opening/closing determination unit determines that the user's eye is in an open eye state, the control unit 2 changes an illuminance and a light color by controlling the illumination device depending on the sight line direction detected by the sight line detection unit.

According to the illumination control system, when the user's eye is opened from the closed eye state, it is possible to reduce the degree of a glare of the illumination unit 1 felt by a user. Furthermore, according to the illumination control system, it is possible to reduce a glare felt by a user when the user's sight line direction is oriented toward the illumination unit 1. Moreover, according to the illumination control system, when the user's sight line direction is oriented toward the illumination unit 1, it is possible to reduce the sense of discomfort caused by a color depth.

In the illumination control system, the signal detection unit may be at least one of a camera, an eye potential measuring instrument and a brain activity detector. Using this signal detection unit, the illumination control system can detect the opening/closing of the user's eye and can control the illumination unit 1.

According to the illumination control system, it is possible to detect that the user's eye comes into a slightly-open eye state from a closed eye state. At this time, the control unit 2 gradually increases the illuminance after the closed eye state is detected. Thus, the illumination control system can further reduce a glare felt by a user.

According to the illumination control system, it is possible not only to reduce a glare felt by a user but also to reduce power consumption.

The embodiment described above is nothing more than one example of the present invention. The present invention is not limited to the aforementioned embodiment. It goes without saying that the present invention can be differently modified without departing from the technical concept of the present invention.

In the aforementioned embodiment, description has been made on a case where the illuminance and the light color in an arbitrary space are adjusted by controlling the illumination unit 1. However, the control target is not limited to the illumination unit 1. For example, a television set or a backlight of a smart phone may be controlled in the aforementioned manner. In this case, the glare felt by a user or the sense of discomfort caused by a color depth can be reduced using an existing camera mounted to a television set or a smart phone.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teaching.

What is claimed is:

1. An illumination control system for controlling an illumination apparatus, comprising:

a signal detector configured to detect a signal changed depending on an eye state of a person in a space where the illumination apparatus is installed, wherein a determination is made of an opening/closing state of an eye of the person based on the signal detected by the signal detector;

a sight line detector configured to detect a person's sight line direction with respect to the illumination apparatus based on the signal detected by the signal detector; and a controller structured to control the illumination apparatus to reduce an illuminance when a determination is made that the eye of the person is in a closed eye state, and to control the illumination apparatus to change an illuminance and a light color based on the sight line direction detected by the sight line detector when a determination is made that the eye of the person is in an open eye state.

2. The system of claim 1, wherein the signal detector includes at least one of a camera, an eye potential measuring instrument and a brain activity detector.

3. The system of claim 1, wherein the signal detector comprises an eye potential measuring instrument.

4. The system of claim 1, wherein the signal detector comprises a brain activity detector.

* * * * *